Patented July 23, 1935

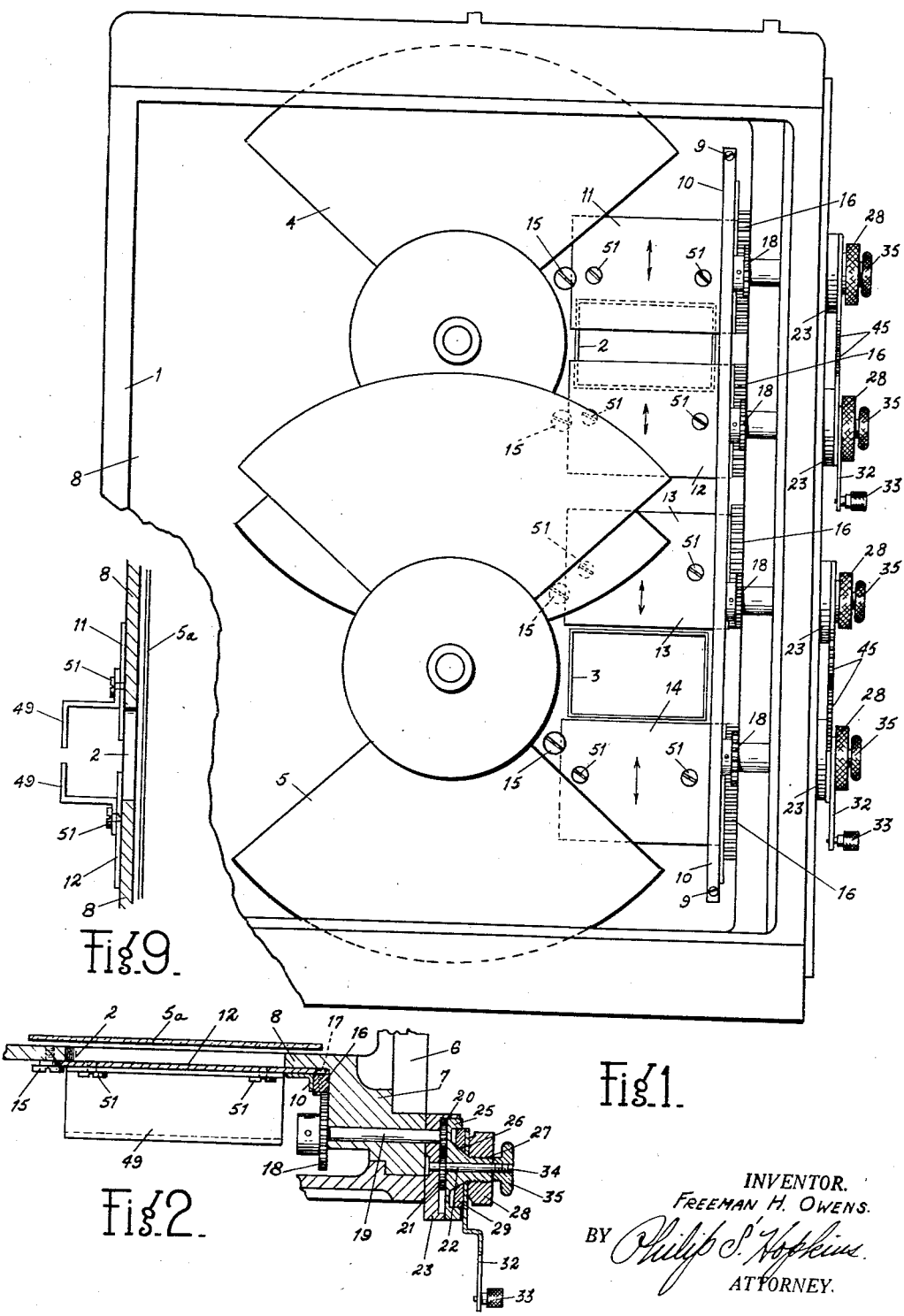

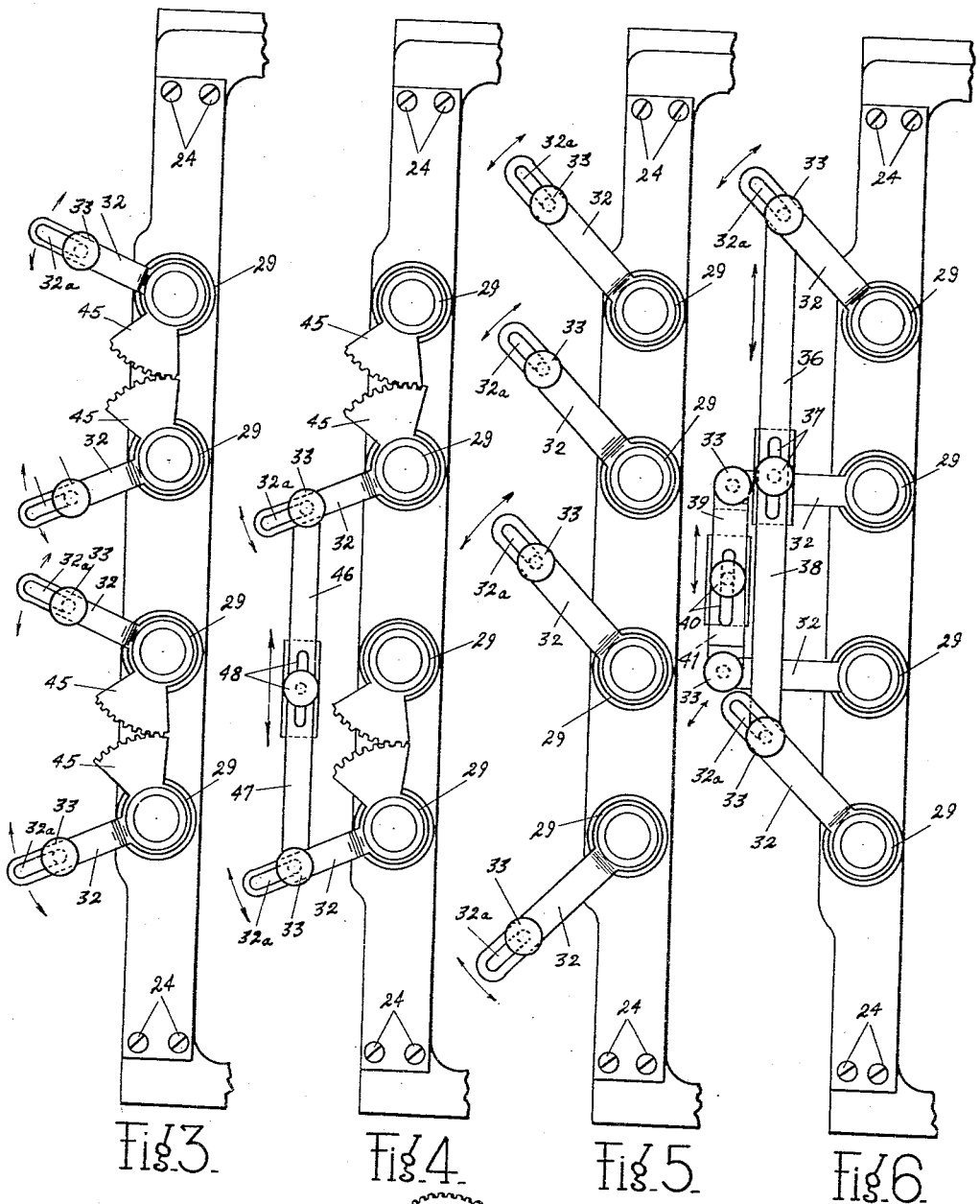

2,008,924

UNITED STATES PATENT OFFICE 2,008,924

SHUTTER DEVICE FOR MOTION PICTURE CAMERAS

Freeman H. Owens, New York, N. Y.

Application June 25, 1930, Serial No. 463,668

5 Claims. (Cl. 88—16)

My invention relates to a shutter device for motion picture cameras and particularly to a type of curtain shutters operable from the exterior of the camera, to selectively open and close the exposure aperture or apertures of the camera.

One important object of my invention lies in the provision of curtain shutter or masking devices operable to selectively cover the exposure aperture from the top or from the bottom or both simultaneously.

Another object of my invention is to provide a plurality of such shutters cooperating with two vertically aligned exposure apertures and with operating means of a character to permit single operation of any individual shutter element or pair of shutter elements, or the simultaneous operation of all of said shutter elements.

On cameras of the double lens type it is often desirable to photograph an object through one lens and then through the other lens, such as changing from a long shot to a close up, or taking portions of or the whole of two scenes simultaneously, the changes to be made while the camera is running; and the effect desired is to shift from one view to the other. Also, depending upon the distance the shutter or masking elements are positioned from the film, my device becomes useful as a dissolving shutter for cameras of this type.

Another object of my invention lies in providing means for rendering the shutter or masking elements effective as dissolving or as curtain shutters.

Furthermore in the taking of motion pictures with a camera either of a single or double lens type, it is frequently desirable to produce "effects" such as that of a curtain closing downwardly or upwardly on the scene, or to mask out a certain portion of the scene being taken. My invention lends itself especially well to the production of such effects.

A further object of my invention lies in the provision of novel actuating means for my shutters, whereby a considerable variety of effects can be produced by various forms of connections between the operating elements.

Still another object of my invention lies in the provision of adjusting means for the operating devices for the shutters whereby the amount of throw or movement thereof can be regulated.

Other objects and advantages in details of construction and arrangement of parts will be apparent as the description proceeds, reference now being had to the figures of the accompanying drawings forming a part of this application and wherein like reference numerals indicate like parts.

In the drawings:—

Figure 1 is a front view of a motion picture camera of the double lens type, the front cover and lens board being removed for clearness of illustration.

Figure 2 is a detail cross sectional view illustrating one form of operating means for my improved shutters.

Figure 3 is a detail side view illustrating one form of operating means for the shutters.

Figure 4 is a view similar to Figure 3 showing an adaptation of the operating means of Figure 3.

Figure 5 is a detail side view illustrating a modified form of shutter operating means.

Figure 6 is a view similar to Figure 5 showing an adaptation thereof.

Figure 7 is a detail perspective view illustrating the operating lever of the type shown in Figures 5 and 6.

Figure 8 is a detail perspective view illustrating the type of operating lever shown in Figures 3 and 4.

Figure 9 is a detail cross section illustrating the auxiliary shutter members in position.

The reference numeral 1 refers to a casing of a motion picture camera which in this instance is provided with two vertically aligned exposure apertures 2 and 3, having rotatable shutters 4 and 5 adapted to respectively cooperate with the apertures 2 and 3 for intermittently covering and uncovering them during the operation of the camera. The film 5a is adapted to be moved past the exposure apertures by any suitable intermittent film moving mechanism, not shown.

Provided on the side wall 6 of the camera directly adjacent the exposure apertures 2 and 3, is a boss 7 (see Figure 2) forming one edge of a partition 8 in which the exposure apertures are positioned. Suitably secured as by screws 9 to the boss 7 is a flanged guide member 10 disposed along one side of each of the apertures 2 and 3 and for a distance on either side thereof. The guide 10 is spaced slightly from the partition 8 and from the boss 7 and slidably mounted between the guide 10 and partition 8, and extending outwardly across the partition 8 in position to cover or uncover the apertures 2 and 3, are a plurality of curtain shutter elements 11, 12, 13 and 14, the first two serving to cooperate with the exposure aperture 2 and the last two with the exposure aperture 3. Screws 15 are provided in the partition 8 with the heads thereof spaced from such partition, to form guiding means for the inner edge of the shutter members 11, 12, 13, and 14.

Each of the shutter members just mentioned is provided adjacent its outer ends with toothed racks 16 secured to the shutter members as by screws 17 and such racks being slidably disposed between the boss 7 and one flange of the guide 10.

Meshing with the teeth of each of the racks 16, are gears 18 on stub shafts 19 journaled in the boss 7, the opposite ends of which shafts extend outwardly beyond the side 6 of the camera and are provided with pinions 20 meshing with pinions 21 carried by the pins 22 journaled in a plate 23 suitably secured as by screws 24 (see Figures 3, 4, 5 and 6) to the outer edge of the boss 7. Also secured upon the pins 22 are disk members 25, each provided centrally with an outwardly bevelled or conical shaped portion 26 having a threaded end portion 27. A nut 28 is screw threaded on each of the threaded ends 27 of these disk members. Disposed between the nuts 28 and the conical shaped portions 26 of the disk, are actuating disks 29 provided with central openings 30, the material around the edges of said openings 30 being bevelled as at 31 to fit the bevelled portions 26 of the disks. Carried by each actuating member 29 is a handle 32 provided with a finger piece 33, there being one of these devices for each of the shutter members 11, 12, 13 and 14. Obviously, the nut 28 when tightened, clamps the actuating disk 29 to the disk 25, carried by the pin 22, whereby upon rotation of the handle 32 and disk 29, the pin 22 and the pinion 21 thereon will be rotated, thus rotating the pinion 20 and shaft 19 and consequently the gear 18 meshing with rack 16, whereby the particular shutter element so actuated will be caused to move up or down in the guides provided, the direction of movement being dependent upon the direction of rotation of the handle 32. The end of the pin 22 is threaded as at 34 to receive a lock nut 35 whereby to insure the clamping and locking engagement of the nut 28 with the actuating disk 29.

In order that the distance of movement of the handles 32 and consequently the shutter members, may be regulated, when tied together as in Figures 4 and 6, the handles 32 are slotted as at 32a, and the finger pieces 33 are formed as clamp screws as shown clearly in Figure 7, whereby the links 36 and 38 and 46 and 47 may be attached to the handles at varying distances from their ends, thus governing or regulating the throw thereof.

The details of the operating device just described are shown clearly in Figures 2, 7 and 8. In Figure 6, is shown means whereby the upper shutter element 11 for the aperture 2 and the lower shutter element 14 for the aperture 3, may be connected for simultaneous operation, such connection taking the form of a link 36 pivoted to the end of the upper lever 32 and having an adjustable pin and slot connection indicated at 37 with a link 38 pivoted at its lower end to the end of the lowermost lever 32. Thus by locking the links 36 and 38 together, the shutter elements 11 and 14 may be operated simultaneously. Likewise, the operating lever 32 for the shutter element 12 may have pivoted to its free end a link 39 connected at its lower end by the pin and slot means 40 with a link 41 pivoted at its lower end to the end of the operating lever 32 for the shutter element 13. Thus, the shutter elements 12 and 13 may be operated simultaneously. Obviously, these link connections may be dispensed with and each shutter element actuated independently as shown in Figure 5.

Figures 1, 3, 4 and 8 illustrate a slightly different form which the operating means may take and in which case the actuating disks 29 are provided with segment racks 45, the racks for the two upper actuating disks meshing with each other whereby the shutter elements 11 and 12 may be simultaneously operated upon movement of either of the actuating disks 29 for such elements. Likewise, the lower actuating disks 29 are provided with segment racks 45 meshing with each other whereby the lower elements 13 and 14 may be simultaneously operated.

In this form, if desired, the operating handles 32 may be omitted from the actuating disks for the shutter elements 11 and 13.

Also if desired, the ends of the operating levers 32 connected with the actuating disks 29 for the shutter elements 12 and 14, may be connected by the links 46 and 47 pivoted at one end to the ends of the levers 32 and provided with the pin and slot connection 48 at the inner ends of such links. Thus there is provided means whereby all four of the shutter elements may be actuated simultaneously.

As is well known, if the shutter elements are positioned closely adjacent the film, the effect produced when photographing a scene past the same, is to cut the scene rather sharply by the edges of the shutters, which edges may of course, be any desired shape or angle, thus providing a curtain or masking effect. If, however, the shutter members are disposed away from the film, the effect is a "dissolving" one with respect to the scene photographed on the film. In order to adapt my device to the latter effect, I provide auxiliary shutter members 49, one for each of the shutter members 11, 12, 13 and 14, which may be attached or detached as desired. These are shown clearly in Figures 2 and 9 and comprise angular members removably held as by the screws 51 to the respective shutter slides to which they are attached. Obviously, with these auxiliary shutter members attached, the effective shutter edge, with respect to the film, is that of the auxiliary shutter, spaced from the film and the resultant effect thereof is "dissolving" rather than a curtain or mask.

Obviously, other combinations for the actuation of the shutter elements may be provided by simple modifications and adaptations of this invention.

Of course, changes may be made in details of construction and operation without departing from the spirit and scope of my invention. I do not limit myself, therefore, to the exact form herein shown and described other than by the appended claims.

I claim:

1. A motion picture camera provided with a fixed exposure aperture past which a film is movable, adjustable masking members cooperating with said aperture to selectively open and close the same with respect to said film, toothed racks on said members, separate pinions meshing with each of said racks, and rotating means for said pinions whereby each of said members may be independently moved, and connecting means between said rotating means whereby said pinions may be operated simultaneously.

2. A motion picture camera provided with a fixed exposure aperture past which a film is movable, adjustable masking members cooperating with said aperture to selectively open and close the same with respect to said film, toothed racks on said members, pinions meshing with said racks, and rotating means for said pinions whereby each of said members may be moved, and connecting means between said rotating means whereby said pinions may be operated simultaneously, said connecting means comprising meshing gear segments carried by said rotating means.

3. A motion picture camera provided with a pair of spaced aligned exposure apertures past which a film is movable, a pair of adjustable masking members cooperating with each of said apertures to open and close the same with respect to said film, independent operating means for each of said members and means for selectively connecting any and all of said operating means whereby any of said members may be selectively adjusted independently or simultaneously.

4. A motion picture camera provided with a pair of spaced aligned exposure apertures past which a film is movable, a pair of adjustable masking members cooperating with each of said apertures to open and close the same with respect to said film, said members being movable toward and away from each other over said aperture, independent operating means for each of said members and means for selectively connecting all of said operating means whereby all of said members may be adjusted simultaneously, said connecting means being selectively connectable with any of said operating means whereby to selectively cause movement of certain of said members in one direction and certain of said members in the opposite direction.

5. A motion picture camera provided with an exposure aperture past which a film is adapted to be moved, adjustable masking members cooperating with said aperture to selectively open and close the same, and means comprising auxiliary shutter members removably secured to said first named members and having the effective edges thereof parallel to and spaced from said first members in a direction away from the film to provide a dissolving shutter.

FREEMAN H. OWENS.